(12) United States Patent
Johnson (10) Patent No.: US 7,787,032 B2
(45) Date of Patent: Aug. 31, 2010

(54) METHOD AND APPARATUS FOR DARK CURRENT REDUCTION IN IMAGE SENSORS

(75) Inventor: Richard Scott Johnson, Boise, ID (US)

(73) Assignee: Aptina Imaging Corporation, Grand Cayman (KY)

(*) Notice: Subject to any disclaimer, the term of this patent is extended or adjusted under 35 U.S.C. 154(b) by 499 days.

(21) Appl. No.: 11/819,977

(22) Filed: Jun. 29, 2007

(65) Prior Publication Data
US 2009/0002508 A1   Jan. 1, 2009

(51) Int. Cl.
H04N 9/64   (2006.01)
(52) U.S. Cl. .................................. 348/243; 348/241
(58) Field of Classification Search .................. None
See application file for complete search history.

(56) References Cited

U.S. PATENT DOCUMENTS

| | | | | |
|---|---|---|---|---|
| 4,760,453 A | * | 7/1988 | Hieda | 348/243 |
| 6,590,611 B1 | * | 7/2003 | Ishida et al. | 348/310 |
| 7,583,306 B2 | * | 9/2009 | Kuwazawa | 348/300 |
| 2002/0109160 A1 | * | 8/2002 | Mabuchi et al. | 257/233 |
| 2006/0097296 A1 | * | 5/2006 | Nam | 257/292 |
| 2007/0278533 A1 | * | 12/2007 | Mabuchi et al. | 257/230 |
| 2008/0136945 A1 | * | 6/2008 | Blanquart et al. | 348/243 |
| 2008/0258045 A1 | * | 10/2008 | Oike et al. | 250/208.1 |
| 2009/0174799 A1 | * | 7/2009 | Lee et al. | 348/294 |

FOREIGN PATENT DOCUMENTS

EP   1 223 623 A2   7/2002

OTHER PUBLICATIONS

Wong, Hon-Sum Philip et al., "CMOS Active Pixel Image Sensors Fabricated Using a 1.8-V, 0.25-μm CMOS Technology", IEEE Transactions on Electron Devices, vol. 45, No. 4, Apr. 1998, pp. 889-894.
International Preliminary Report on Patentability (Jan. 14, 2010).

* cited by examiner

Primary Examiner—David L Ometz
Assistant Examiner—Angel L Garces-Rivera
(74) Attorney, Agent, or Firm—Dickstein Shapiro LLP (57) ABSTRACT

Methods and apparatuses for dark current reduction by adjustment of electrical characteristics of transfer gates in pixels within an imaging sensor based on image comparisons.

21 Claims, 9 Drawing Sheets

METHOD AND APPARATUS FOR DARK CURRENT REDUCTION IN IMAGE SENSORS

FIELD OF THE INVENTION

The embodiments described herein relate generally to imaging devices and, more specifically, to a method and apparatus for dark current reduction in image sensors.

BACKGROUND OF THE INVENTION

Solid state imaging devices, including charge coupled devices (CCD), complementary metal oxide semiconductor (CMOS) imaging devices, and others, have been used in photo imaging applications. A solid state imaging device circuit includes a focal plane array of pixel cells or pixels as an image sensor, each cell including a photosensor, which may be a photogate, photoconductor, a photodiode, or other photosensor having a doped region for accumulating photo-generated charge. For CMOS imaging devices, each pixel has a charge storage region, formed on or in the substrate, which is connected to an output transistor that is part of a readout circuit. The charge storage region may be constructed as a floating diffusion region. In some CMOS imaging devices, each pixel may further include at least one electronic device such as a transistor for transferring charge from the photosensor to the storage region and one device, also typically a transistor, for resetting the storage region to a predetermined charge level prior to charge transference.

In a CMOS imaging device, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel reset and charge states. Photo charge may be amplified when it moves from the initial charge accumulation region to the storage region. The charge at the storage region is typically converted to a pixel output voltage by a source follower output transistor.

CMOS imaging devices of the type discussed above are generally known as discussed, for example, in U.S. Pat. Nos. 6,140,630, 6,376,868, 6,310,366, 6,326,652, 6,204,524, and 6,333,205, assigned to Micron Technology, Inc.

Ideally, the digital images created by CMOS imaging devices are exact duplications of the light image projected upon the imaging sensor. However, various noise sources can affect individual pixel outputs and thus distort the resulting digital image. One such source is dark current, a current that appears as a photodiode signal even in the absence of light.

Dark current may result from many factors, including: leakage in the charge collection region of a photodiode; unwanted electrons from peripheral circuits and electron generation from infrared photons; current generated from trap sites inside or near the photodiode depletion region; band-to-band tunneling induced carrier generation as a result of high fields in the depletion region; junction leakage coming from the lateral sidewall of the photodiode; and leakage from isolation corners, for example, stress induced and trap assisted tunneling.

Reducing dark current in a photodiode is important in image sensor fabrication which use photodiodes as the photoconversion device described above. Methods for reducing dark current are especially important at high temperatures (e.g., greater than 50 degrees Celsius), because dark current increases exponentially with temperature. Additionally, because dark current may vary over the lifespan of an imaging device, these devices may become more susceptible to dark current influence and thus produce images of decreasing quality over time. Accordingly, a method to reduce dark current in imaging devices is needed.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

The terms "semiconductor substrate" and "substrate" are to be understood to include any semiconductor-based structure. The semiconductor structure should be understood to include silicon, silicon-on-insulator (SOI), silicon-on-sapphire (SOS), silicon-germanium, doped and undoped semiconductors, epitaxial layers of silicon supported by a base semiconductor foundation, and other semiconductor structures.

Figure 1:
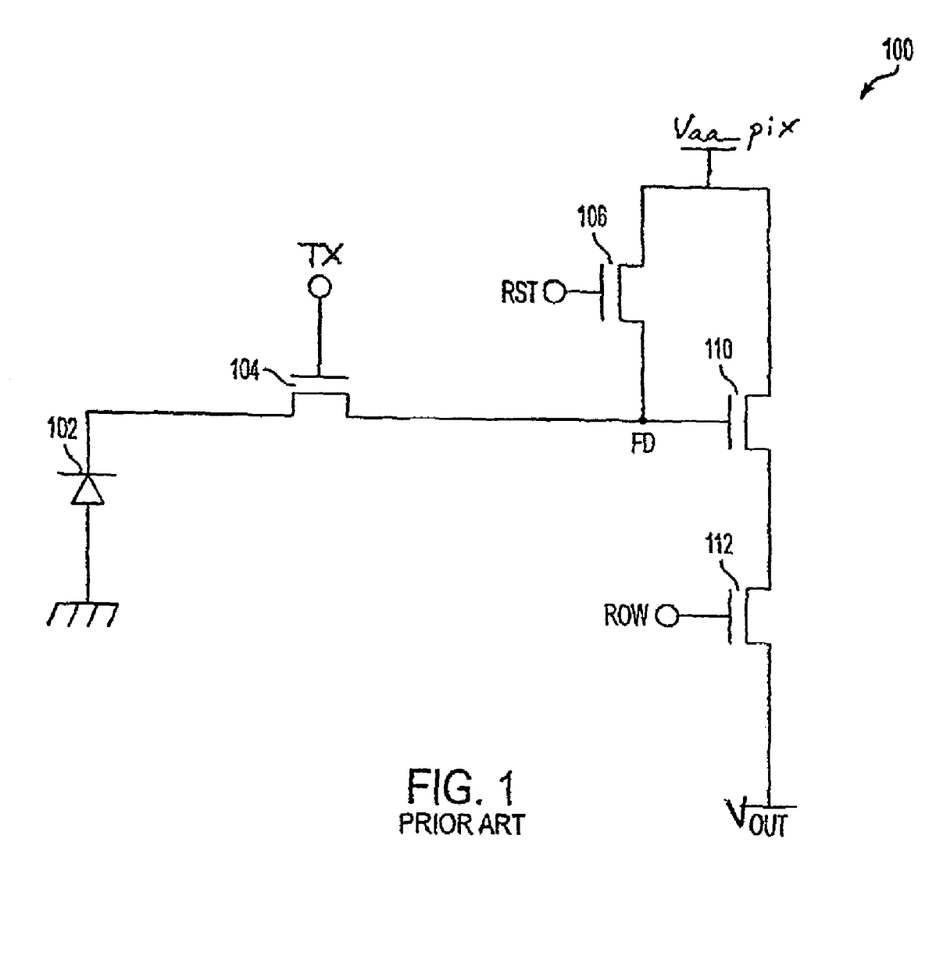
FIG. 1 is a schematic diagram of a conventional four transistor pixel.

The term "pixel," as used herein, refers to a photo-element unit cell containing a photosensor for converting photons to an electrical signal. For purposes of illustration, a single representative pixel is illustrated in FIG. 1 and described herein; however, typically a plurality of like pixels are included in a pixel array. Accordingly, the following detailed description is not to be taken in a limiting sense. Embodiments described herein adjust for dark current to enhance image acquisition in low light settings.

In the following description, the embodiments are described in relation to a CMOS imager for convenience; however, they have wider applicability to any photosensor of any imager device. For example, a photosensor may be implemented as a pinned photodiode, a p-n junction photodiode, a Schottky photodiode, a photogate, or any other suitable photoconversion device.

For most applications, pixel arrays are often fabricated in large batches on dies of a wafer. These dies are often fabricated according to a common design, which is used for each die on each wafer in that product line. Even so, defects in the fabrication process, the substrate material, or the fabrication elements may cause small differences between dies on the same wafer. These differences, even when minor, may create large differences in the relative performance of each die, including the creation of dark current.

A typical four transistor (4T) CMOS image sensor pixel 100 is shown in FIG. 1. The pixel 100 includes a photosensor 102 (e.g., photodiode, photogate, etc.), transfer transistor 104, floating diffusion region FD, reset transistor 106, source follower transistor 110, and row select transistor 112. The photosensor 102 is connected to the floating diffusion region FD by the transfer transistor 104 when the transfer transistor 104 is activated by a transfer control signal TX.

The reset transistor 106 is connected between the floating diffusion region FD and an array pixel supply voltage Vaa_pix. A reset control signal RST is used to activate the reset transistor 106, which resets the floating diffusion region FD to the array pixel supply voltage Vaa_pix level as is known in the art.

The source follower transistor 110 has a gate connected to the floating diffusion region FD and is connected between the array pixel supply voltage Vaa_pix and the row select transistor 112. The source follower transistor 110 converts the charge stored at the floating diffusion region FD into an electrical output voltage signal Vout. The row select transistor 112 is controllable by a row select signal ROW for selectively connecting the source follower transistor 110 and its output voltage signal Vout to a column line of a pixel array.

Each transistor 104, 106, and 112 in FIG. 1 operates as a controlled switch. Each transistor operates when its associated control line is activated by an activation voltage, and it is subsequently deactivated when the voltage on the line is set to a different, usually lower, deactivation voltage. These activation and deactivation voltages are named after the control signal to which they relate. The transfer control signal TX is considered activated when an activation voltage TXHigh is applied to it and is considered deactivated when the voltage applied is lowered to a deactivation voltage TXLow. Other activation and deactivation voltages exist for the reset control signal RST (e.g., RSTHigh and RSTLow) and row select control signal ROW (e.g., ROWHigh and ROWLow, respectively). In the prior art, these voltage levels are set to a particular value when fabricated, with each particular activation or deactivation voltage level being held constant across different pixels and dies. In the prior art, TXLow, for example, is often a constant value across all pixels on a wafer (including several dies). Some devices in the prior art may have a set of preset values for TXLow, depending on the circumstances (such as using one value for TXLow for bright images and a different value for TXLow for dark images). These voltage levels are fixed during fabrication, so TXLow, for example, would remain at a constant value throughout the lifetime of a pixel. As discussed below, this may present a problem.

Figure 2:
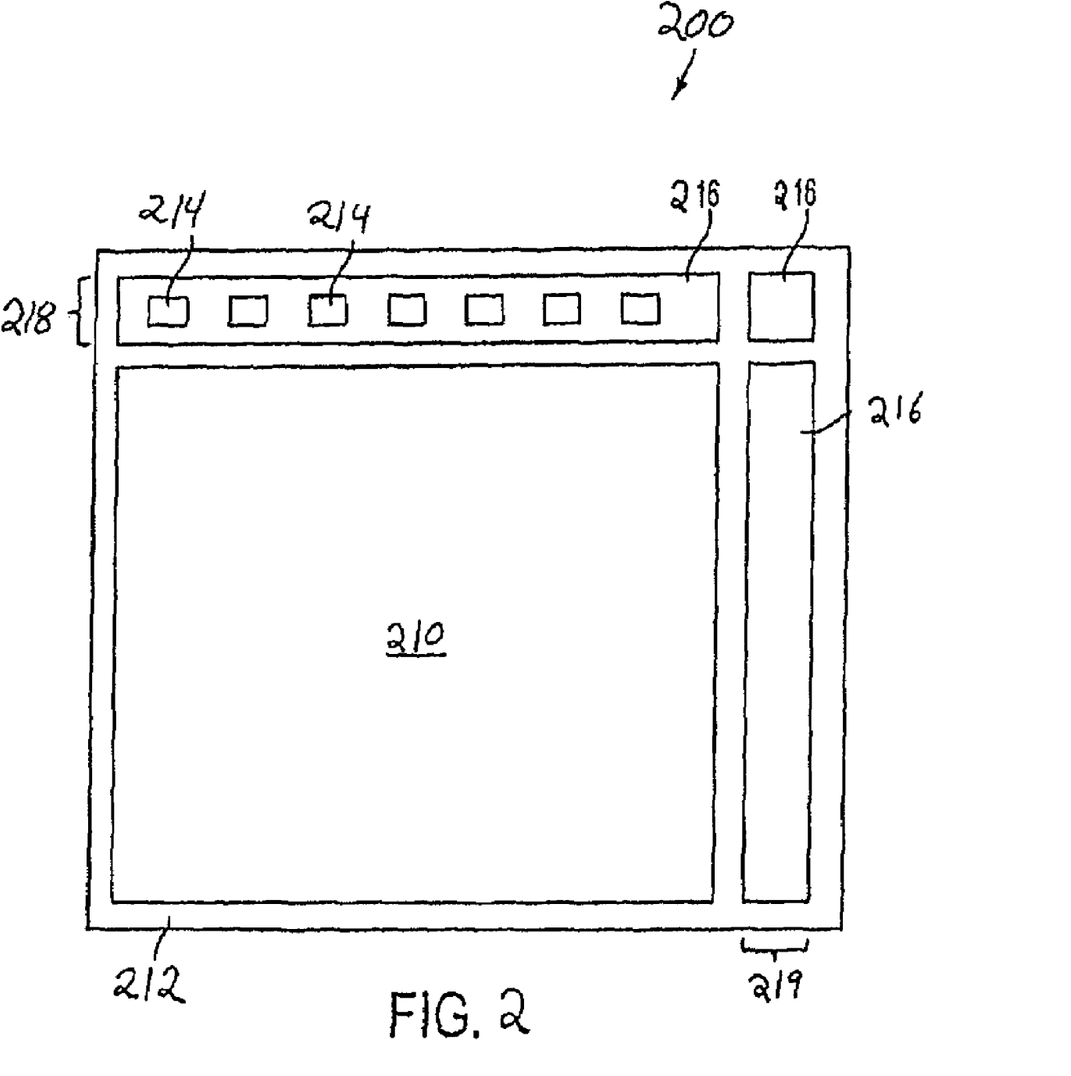
FIG. 2 is a representation of a top view of an example pixel array.

FIG. 2 shows a representative CMOS imaging device pixel array 200 which may be used in embodiments described below. It has an area 210 that contains rows and columns of imaging pixels, area 212 that contains rows and columns of barrier pixels which separate the imaging pixels from other pixels and circuits, several areas 214 that contain rows and columns of optical black pixels, and areas 216 that contain rows and columns of tied pixels. To obtain color images, the array 200 uses a red, green, blue (RGB) Bayer pattern color filter array (CFA) over the imaging pixels in area 210. Hereinafter, when a pixel is referred to by a color (e.g., a red pixel), it should be appreciated that the pixel is associated with a color filter designed to pass that color of light (e.g., red) to the pixel. Alternatively, another color filter pattern may be used or the color filter array may be omitted for a monochrome image sensor.

Optical black pixels in area 214 and tied pixels in area 216 are arranged in dark rows 218. A dark row is one that is not exposed to light and can be covered by a light shield layer, such as, for example, a metallization layer, a black color filter, etc. It should be appreciated that areas of optical black pixels 214 and areas of tied pixels 216 may be arranged in any pattern within the dark rows 218 and are not limited to the arrangement shown in FIG. 2. Additionally, tied pixels in area 216 may, but need not, be arranged in dark columns 219. Optical black pixels in area 214 have the same structure as the imaging pixels in area 210 except they are covered and arranged in dark rows so that incident light will not affect their signal output. The photosensor within each tied pixel in area 216 is connected to a fixed voltage via a metal contact so that the signal of the tied pixel in area 216 is not affected by dark current.

Figure 3:
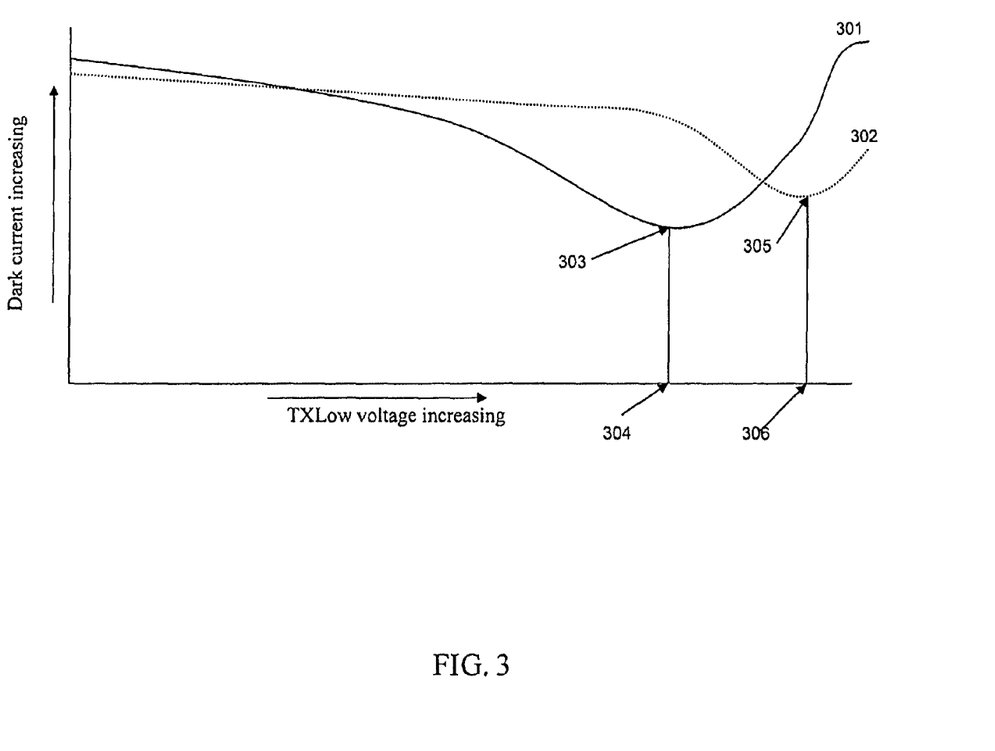
FIG. 3 is a graph showing the dark current induced in two representative pixels using varying TXLow voltages.

FIG. 3 is a graph representing the behavior of two representative pixel arrays manufactured according to identical processes. FIG. 2 is one example of the pixel array. The graphs show a reduction in dark current across a pixel array accomplished by varying the value of the deactivation voltage TXLow applied to a transfer transistor, e.g. 104 of FIG. 1. The horizontal axis represents the level of the deactivation voltage TXLow (with voltage increasing to the right of the graph) applied to each transfer transistor 104. The vertical axis of the graph shown in FIG. 3 indicates the amount of dark current (with increasing current towards the top of the graph) produced in the representative pixel arrays.

Curve 301 represents an average of the dark current produced across a pixel array while applying different levels of the deactivation voltage TXLow to each transfer transistor (e.g. 104 in FIG. 1) in a first representative pixel array. Curve 302 represents an average of the dark current produced across a pixel array while varying the deactivation voltage TXLow supplied to the transfer transistor 104 in a second representative pixel array. As shown by curves 301 and 302, a reduction in dark current may be achieved by manipulation of the deactivation voltage TXLow applied to each transfer transistor 104. Also shown by curves 301 and 302 is that the level of deactivation voltage that produces the least dark current differs in each pixel array. For example, the lowest amount of dark current in the pixel array represented by curve 301 occurs at point 303, which corresponds to a deactivation voltage TXLow indicated by point 304. However, the lowest amount of dark current in the pixel array represented by curve 302 occurs at point 305, which corresponds to a deactivation voltage TXLow indicated by point 306, a different voltage than that indicated by point 304. As FIG. 3 shows, it is desirable to apply a deactivation voltage to transfer transistors dependent on the particular characteristics of each pixel array and associated components.

Figure 4:
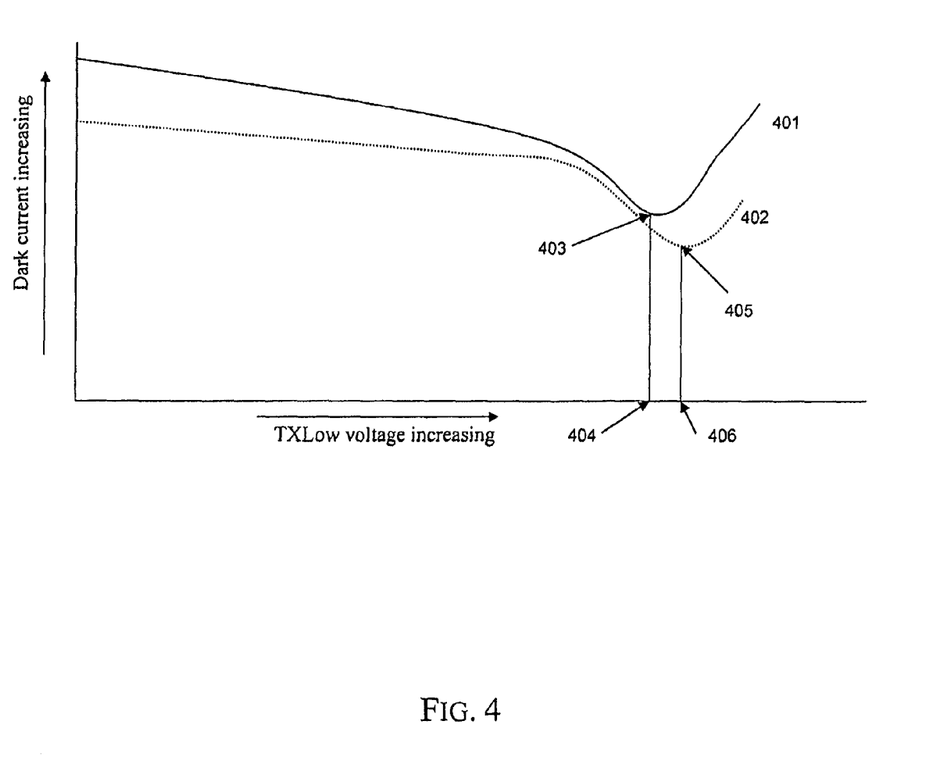
FIG. 4 is a graph showing the dark current induced in one representative pixel using varying TXLow voltages under two different operating conditions.

FIG. 4 is a graph representing the behavior of one representative pixel array while capturing an image at two different points in time. The horizontal axis represents the amount of deactivation voltage TXLow (with voltage increasing to the right of the graph) applied to each transfer transistor (such as transfer transistor 104 in FIG. 1) in the representative pixel array. The vertical axis indicates the average amount of dark current created in the representative pixel array (with increasing current towards the top of the graph).

Curves 401 and 402 demonstrate the effect of varying the deactivation voltage TXLow applied to each transfer transistor (e.g. 104 in FIG. 1) on the dark current induced in the pixel array of an associated imaging device at different points in time. As shown in this graph, the deactivation voltage TXLow that produces the least dark current differs at different points in time even in the same imaging device. This effect may be caused by exposure to radiation over time (for example, due to repeated high-altitude flights), changes in temperature, or any number of other factors that might affect the photosensors and their related substrate and circuitry. For example, the lowest amount of dark current in the imaging device at the time represented by curve 401 occurs at point 403, which corresponds to the deactivation voltage TXLow indicated by point 404. However, the lowest amount of dark current in the imaging device at a different time, represented by curve 402, occurs at point 405, which corresponds to level of the deactivation voltage TXLow indicated by point 406, which is a different voltage than that indicated by point 404. For this reason, it is desirable to modify the level of the deactivation voltage TXLow at different points in time.

Figure 5:
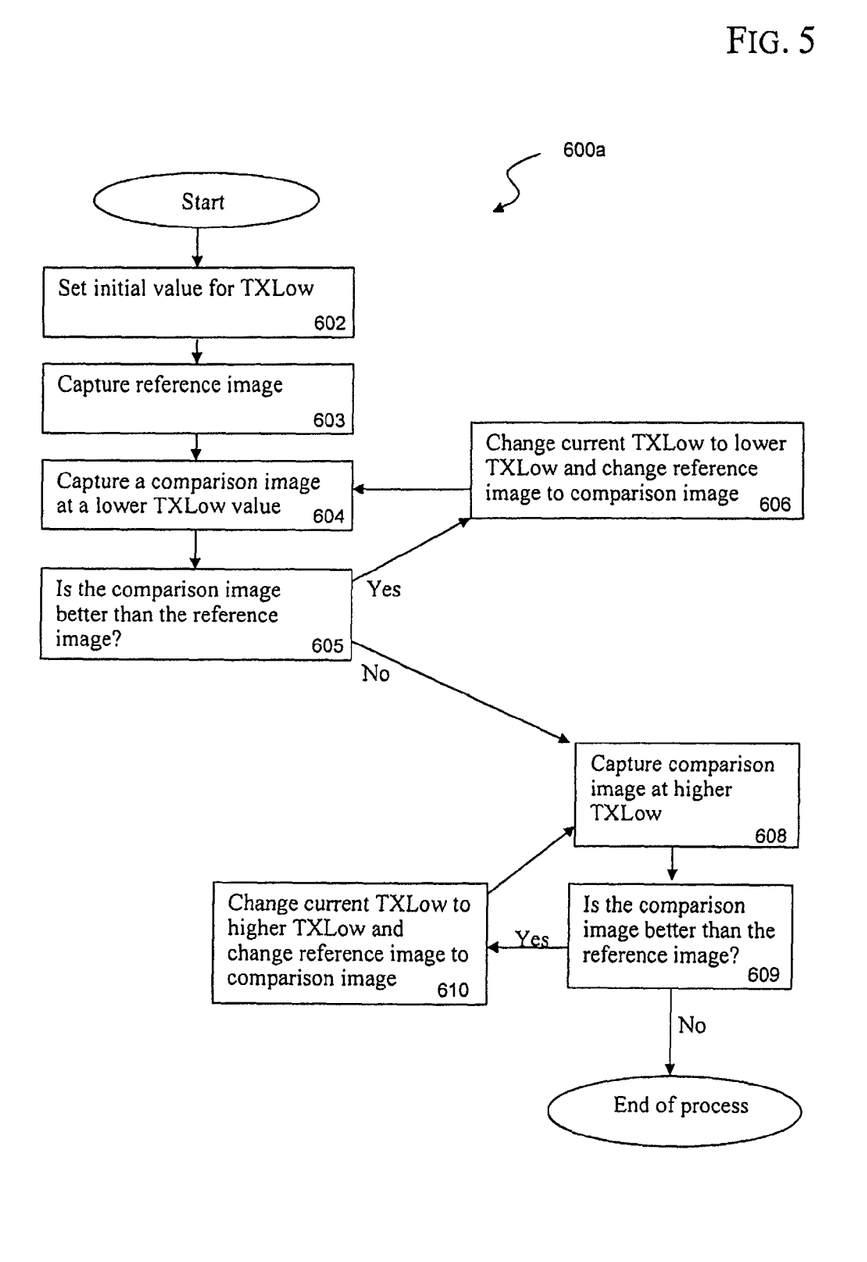
FIG. 5 is a flowchart of a dark current reduction method based on varying a TXLow voltage of an example image sensor.
Figure 6A:
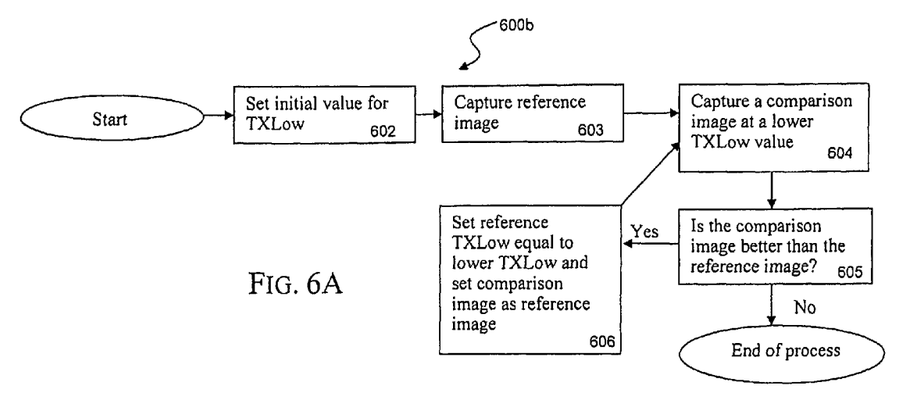
FIG. 6A is a flowchart of a dark current reduction method based on varying a TXLow voltage of an example image sensor.
Figure 6B:
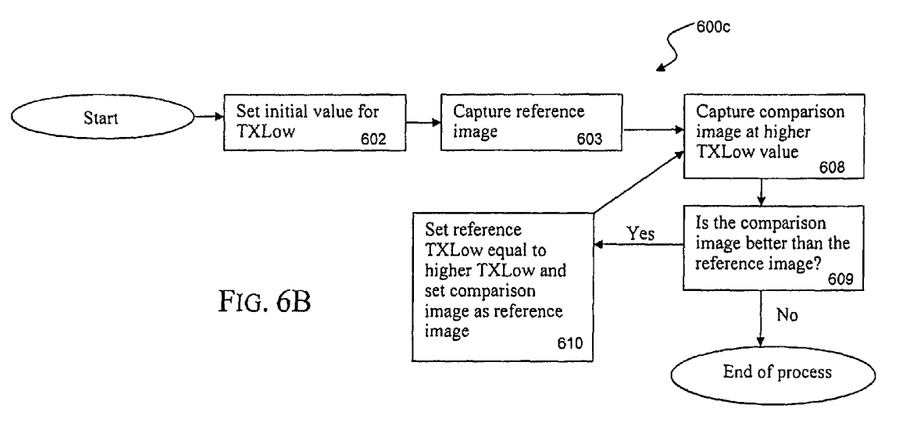
FIG. 6B is a flowchart of a dark current reduction method based on varying a TXLow voltage of an example image sensor.

FIGS. 5, 6A, and 6B are flowcharts depicting three embodiments of a method implemented by an imaging device having a pixel array, such as a digital camera for determining a TXLow voltage for a pixel array. The embodiments depicted in these figures, prior to acquiring an image for use by a user or a system of which the embodiments are part, repeatedly modify the value of the deactivation voltage TXLow applied to a transfer transistor (such as 104 in FIG. 1) and capture comparison images. The comparison images are analyzed to determine a deactivation voltage that seeks to minimize the dark current produced within the pixel array. This repeated capture and analysis occurs prior to acquiring the final image.

FIG. 5 depicts a flowchart of an embodiment 600*a* that may be performed by an imaging device having a pixel array. The embodiment depicted in FIG. 5 may be viewed as three phases. First, there is an initial phase of steps 602 and 603, in which initial conditions are established (an initial reference TXLow is determined and an initial reference image is captured). At step 602, the imaging device sets an initial value as the reference TXLow. The term "reference TXLow" as used in this description is the TXLow voltage that has thus far resulted in images least affected by dark current. This initial value selected by the imaging device may be a constant value for the imaging device (such as a manufactured, preset value), it may be calculated (for example, if an image has already been captured, the device may calculate an initial value from that image), or it may be the last value used (stored in a memory after the last image taken). After an initial reference TXLow is set, a reference image is captured using that TXLow voltage (step 603) during the image capture.

There is then a decremental phase (steps 604-606), in which the value of TXLow is lowered and new images are captured using the lower TXLow value, repeatedly if necessary, until lowering the value of TXLow ceases to reduce the effect of dark current on the images. The imaging device captures a comparison image (step 604), using a lower TXLow voltage than used in step 603. The method of determining a lower TXLow voltage may be performed in a number of ways. For example, the imaging device may set the lower TXLow to be a specific percentage of the reference TXLow, or the lower TXLow may be set as a fixed voltage amount lower than the reference TXLow.

At step 605, the imaging device performs a comparison of the two images to determine which image is preferred. This comparison may be done in several ways. For example, step 605 may include comparing the average signal value across both images. Because dark current increases the average signal value, the image with a lower average signal value is preferred. If the comparison image is preferred, the imaging device assigns the lower TXLow value used in step 604 as the reference TXLow and assigns the comparison image captured at step 604 as the new reference image (step 606). The process then continues through steps 604-606 until it is determined that the reference image is preferred over the comparison image in step 605. When the comparison of step 605 reveals that the reference image is preferred, the method 600*a* proceeds to step 608.

There is then an incremental phase (steps 608-610), in which the value of TXLow is raised and new images are captured and compared, until raising the value of TXLow ceases to reduce the effect of dark current on the images. At step 608, the imaging device captures a comparison image using a TXLow that is higher than the present reference TXLow. The process for determining a higher TXLow may be similar to the processes discussed in reference to step 604 above. That is, it may be a percentage of the present TXLow or some fixed voltage amount higher than the present reference TXLow. The method 600*a* then performs a comparison of the reference and comparison images (step 609). This comparison may be performed in the same manner as that of step 605, and the discussion related to step 605 applies to step 609 as well. If the comparison image is preferred over the reference image, the process continues to step 610, where the reference is set equal to the comparison image and the reference TXLow is set equal to the higher TXLow of step 608. The process will then repeat steps 608-610 until it is determined that the reference image is preferred at step 609. At that point, a suitable TXLow has been found and the process ends.

It should be apparent to one skilled in the art, however, that the disclosed technique may be implemented in many other ways. For example, the incremental phase may be omitted, especially if a sufficiently high value (determined according to the particular device) is used for TXLow or if an upper bound is already known for the imaging device. Such an embodiment is depicted by the flowchart in FIG. 6A. While the embodiment of FIG. 6A has an initial phase (steps 602 and 603, as described above) and a decremental phase (steps 604-606, as described above), process 600*b* has no incremental phase. The process 600*b* ends when an estimated lower bound for TXLow is found in step 605 (an estimated lower bound for TXLow has been found when the reference image is preferred over a comparison image taken with a lower TXLow). FIG. 6B shows a similar process 600*c* having an initial phase (steps 604-606, as described above) and an incremental phase (608-610) with no intervening decremental phase.

The images captured in steps 603, 604, and 608 may be composed of signals from the active pixels (as shown in FIG. 2, active pixels are those within the area denoted by reference numeral 210) and dark pixels (as shown in FIG. 2, dark pixels are those pixels within the area denoted by reference numeral 216). In another mode of operation, the method 600 uses only dark pixels for the comparison of step 604. In other embodiments, the comparison may use signal from dark pixels and active pixels. It will be obvious to one skilled in the art that different combinations of pixels might be more useful for the comparisons of steps 605 and 609 in certain embodiments of the present invention.

Figure 7A:
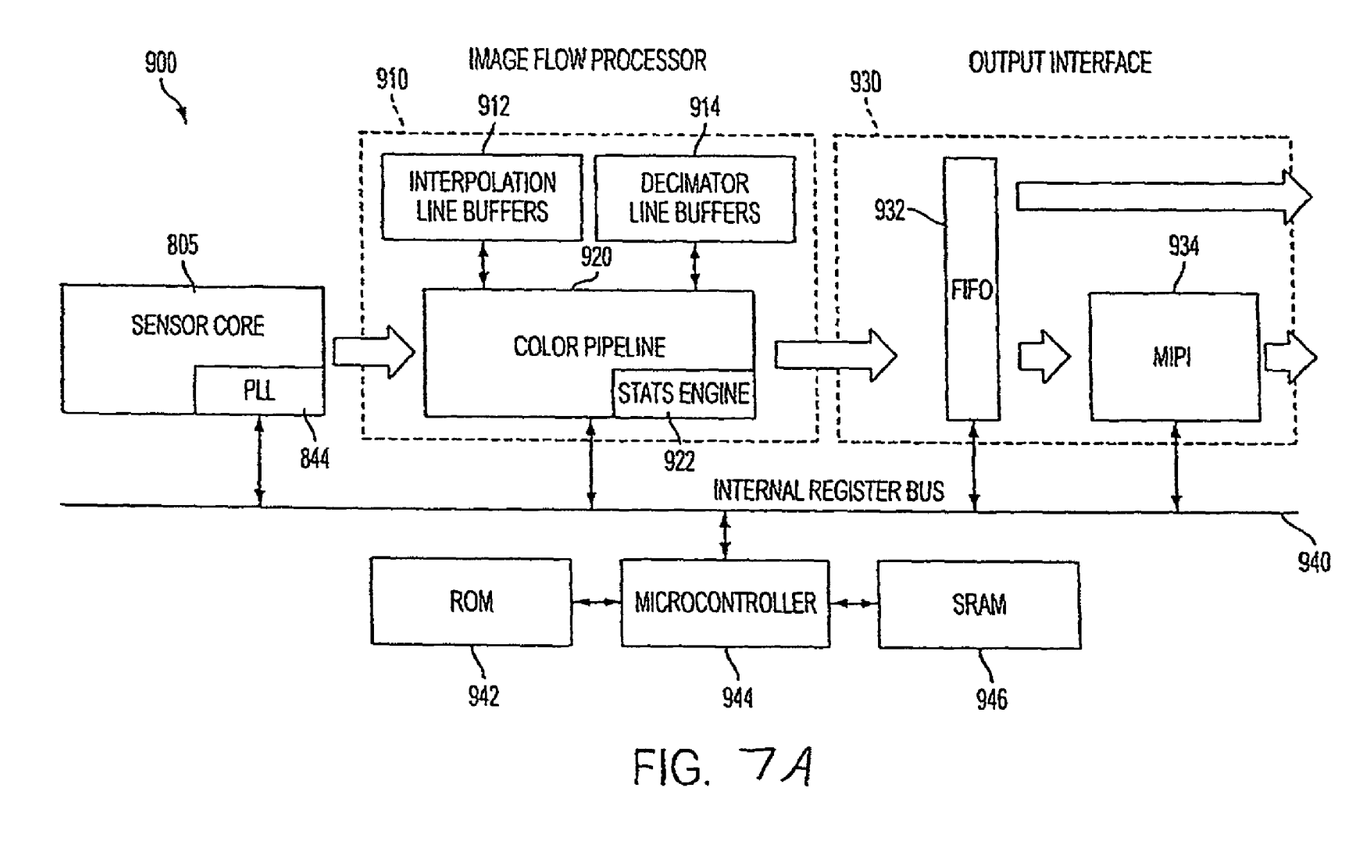
FIG. 7A is a block diagram of system-on-a-chip imaging device constructed in accordance with an embodiment.

FIG. 7A illustrates a block diagram of an exemplary system-on-a-chip (SOC) imaging device 900 constructed in accordance with an embodiment. The imaging device 900 comprises a sensor core 805, containing a pixel array, that communicates with an image flow processor 910 that is also connected to an output interface 930. A phase locked loop (PLL) 844 is used as a clock for the sensor core 805. The image flow processor 910, which is responsible for image and color processing, includes interpolation line buffers 912, decimator line buffers 914, and a color pipeline 920. The color pipeline 920 includes, among other things, a statistics engine 922. The output interface 930 includes an output first-in-first-out (FIFO) parallel output 932 and a serial Mobile Industry Processing Interface (MIPI) output 934. The user can select either a serial output or a parallel output by setting registers within the chip. An internal register bus 940 connects read only memory (ROM) 942, a microcontroller 944 and a static random access memory (SRAM) 946 to the sensor core 805, image flow processor 910 and the output interface 930.

Figure 7B:
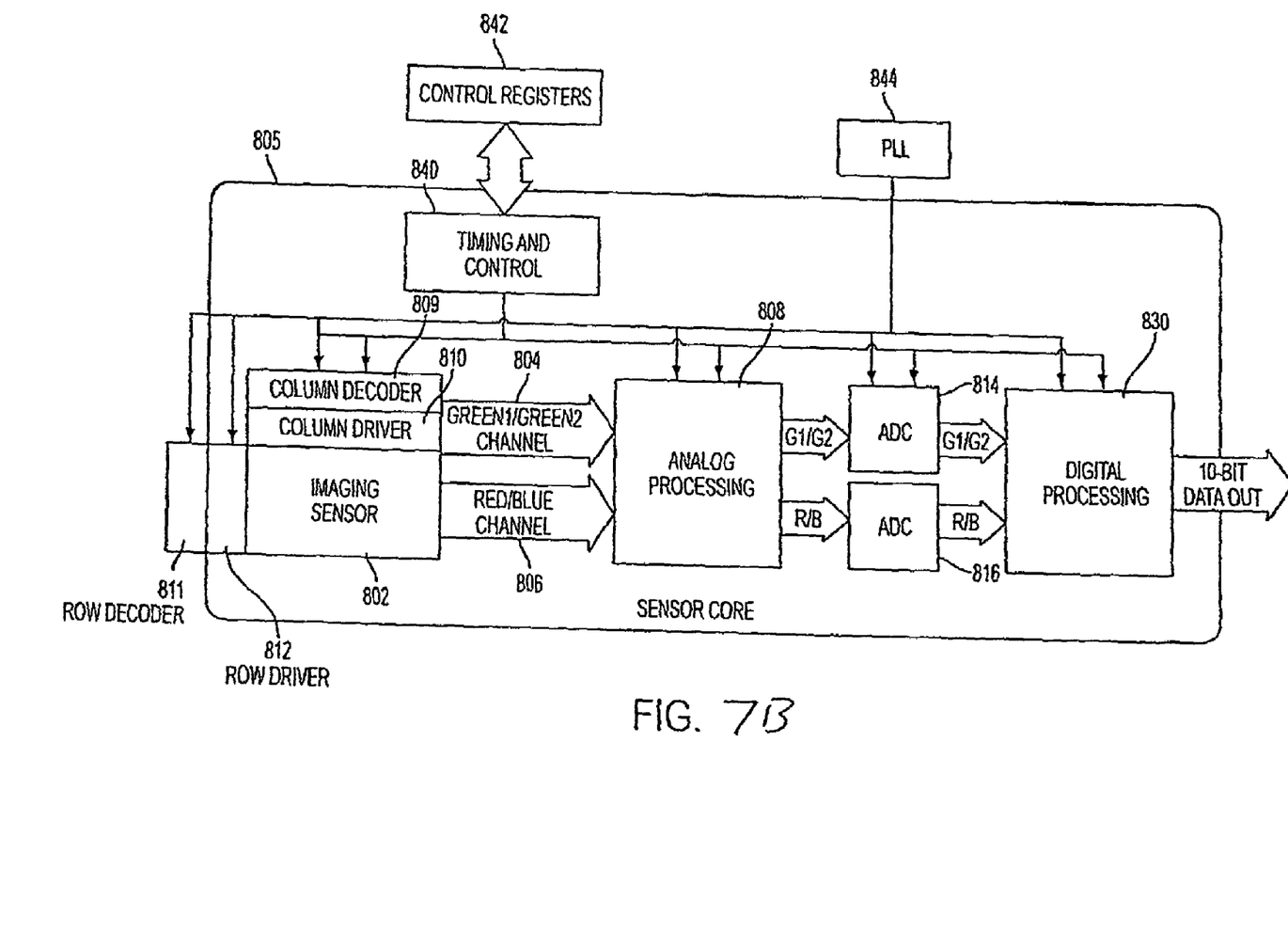
FIG. 7B illustrates an example of a sensor core used in the FIG. 7A device.

FIG. 7B illustrates a sensor core 805 used in the FIG. 7A imaging device 900. The sensor core 805 includes an image sensor 802 containing a pixel array, which is connected to analog processing circuitry 808 by a greenred/greenblue channel 804 and a red/blue channel 806. Although only two channels 804, 806 are illustrated, there are effectively two green channels, one red channel, and one blue channel, for a total of four channels. The greenred (i.e., Green1) and greenblue (i.e., Green2) signals are readout at different times (using channel 804) and the red and blue signals are readout at different times (using channel 806). The analog processing circuitry 808 outputs processed greenred/greenblue signals G1/G2 to a first analog-to-digital converter (ADC) 814 and processed red/blue signals R/B to a second analog-to-digital converter 816. The outputs of the two analog-to-digital converters 814, 816 are sent to a digital processor 830.

Connected to, or as part of, the image sensor 802 are row and column decoders 811, 809 and row and column driver circuitry 812, 810 that are controlled by a timing and control circuit 840. The timing and control circuit 840 uses control registers 842 to determine how the image sensor 802 and other components are controlled, for example, controlling the mode of operation of the image sensor 802 (e.g., global reset mode or electronic rolling shutter). As set forth above, the PLL 844 serves as a clock for the components in the core 805.

The image sensor 802 comprises a plurality of pixel circuits arrayed in a predetermined number of columns and rows. Image sensor 802 may be configured with dark rows and dark columns in accordance with the embodiments described herein. In operation, the pixel circuits of each row in image sensor 802 are all turned on at the same time by a row select line and the pixel circuits of each column are selectively output onto column output lines by a column select line. A plurality of row and column lines are provided for the entire image sensor 802. The row lines are selectively activated by row driver circuitry 812 in response to the row address decoder 811 and the column select lines are selectively activated by a column driver 810 in response to the column address decoder 809. Thus, a row and column address is provided for each pixel circuit. The timing and control circuit 840 controls the address decoders 811, 809 for selecting the appropriate row and column lines for pixel readout, and the row and column driver circuitry 812, 810, which apply driving voltage to the drive transistors of the selected row and column lines.

Each column contains sampling capacitors and switches in the analog processing circuit 808 that read a pixel reset signal Vrst and a pixel image signal Vsig for selected pixel circuits. Because the core 805 uses greenred/greenblue channel 804 and a separate red/blue channel 806, circuitry 808 will have the capacity to store Vrst and Vsig signals for greenred, greenblue, red, and blue pixel signals. A differential signal (Vrst-Vsig) is produced by differential amplifiers contained in the circuitry 808 for each pixel. Thus, the signals G1/G2 and R/B are differential signals that are then digitized by a respective analog-to-digital converter 814, 816. The analog-to-digital converters 814, 816 supply digitized G1/G2, R/B pixel signals to the digital processor 830, which forms a digital image output (e.g., a 10-bit digital output). The digital processor 830 performs pixel processing operations. The output is sent to the image flow processor 910 (FIG. 7A).

Although the sensor core 805 has been described with reference to use with a CMOS image sensor, this is merely one example sensor core that may be used. Embodiments of the invention may also be used with other sensor cores having a different readout architecture. While the imaging device 900 (FIG. 7A) has been shown as a system-on-a-chip, it should be appreciated that the embodiments are not so limited. Other imaging devices, such as, for example, a stand-alone sensor core 805 coupled to a separate signal processing chip could be used in accordance with the embodiments. Additionally, imaging, optical black, and tied pixel data from the image sensor 802 (FIG. 7B) can be output from the 10-bit data output (FIG. 7B) and stored and compensated elsewhere, for example, in a system as described in relation to FIG. 8 or in a stand-alone image processing system.

Figure 8:
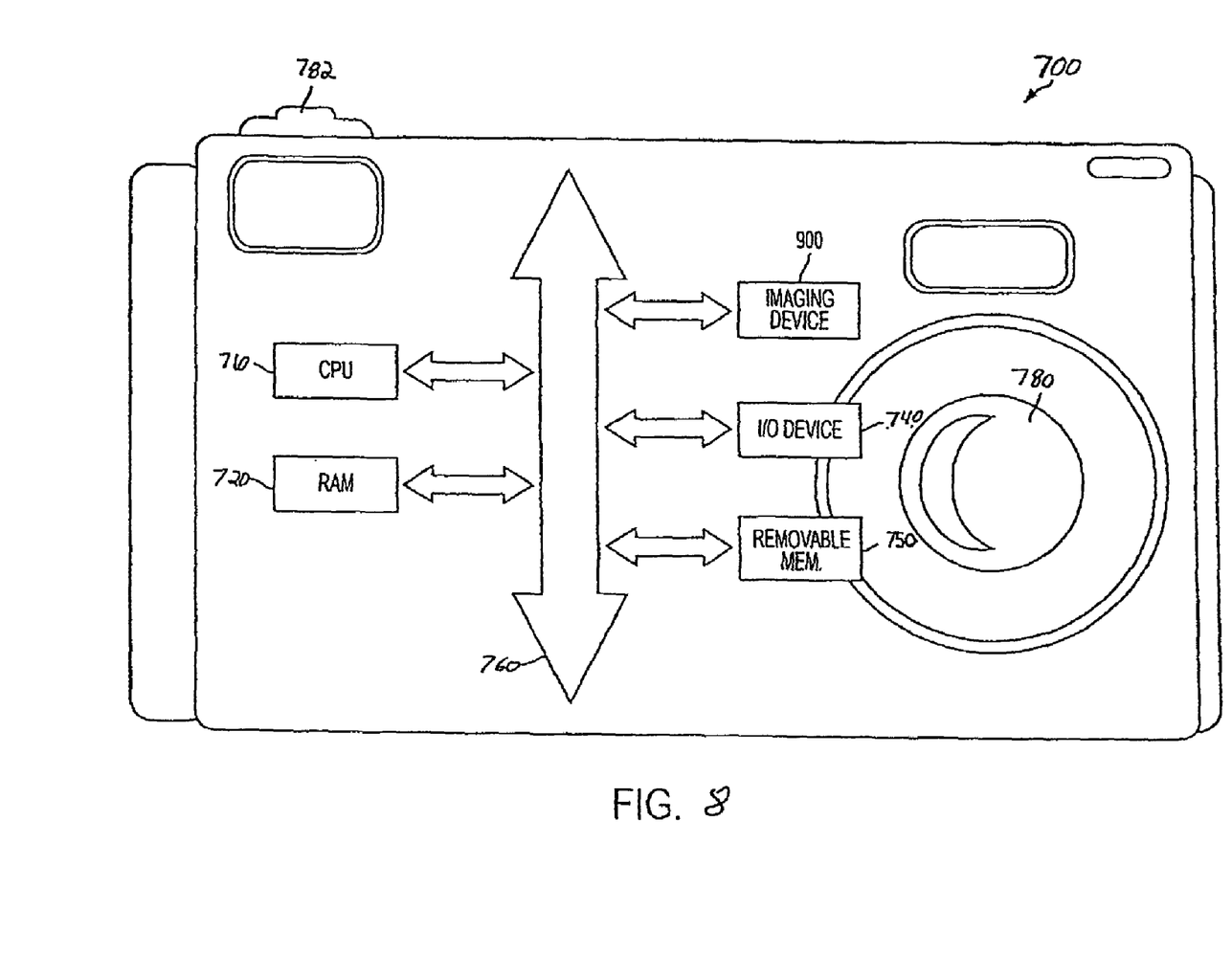
FIG. 8 shows a system incorporating at least one imaging device in accordance with an embodiment described herein.

FIG. 8 shows a typical system 700, such as, for example, a camera. The system 700 is an example of a system having digital circuits that could include imaging devices 900. Without being limiting, such a system could include a computer system, camera system, scanner, machine vision, vehicle navigation system, video phone, surveillance system, auto focus system, star tracker system, motion detection system, image stabilization system, and other systems employing an imaging device 900.

System 700, for example, a camera system, includes a lens 780 for focusing an image on the imaging device 900 when a shutter release button 782 is pressed. System 700 generally comprises a central processing unit (CPU) 710, such as a microprocessor that controls camera functions and image flow, and communicates with an input/output (I/O) device 740 over a bus 760. The imaging device 900 also communicates with the CPU 710 over the bus 760. The system 700 also includes random access memory (RAM) 720, and can include removable memory 750, such as flash memory, which also communicates with the CPU 710 over the bus 760. The imaging device 900 may be combined with the CPU 710, with or without memory storage on a single integrated circuit, such as, for example, a system-on-a-chip, or on a different chip than the CPU 710. As described above, uncompensated data from the image sensor 802 (FIG. 7B) can be output from the imaging device 900 and stored, for example in the random access memory 720 or the CPU 710. The stored data can then be sent outside the camera and stored and operated on by a stand-alone processor, e.g., a computer, external to system 700 in accordance with the embodiments described herein.

The example methods for determining a TXLow described above in relation to FIGS. 5, 6A, and 6B may be performed by the digital processing circuit 830 in FIG. 7B, by the microcontroller 944 illustrated in FIG. 7A, or by the CPU 710. While the embodiments have been described in detail in connection with preferred embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the embodiments are described in connection with a CMOS image sensor, they can be practiced with other types of image sensors.

What is claimed as new and desired to be protected by Letters Patent of the United States is:

1. A method of imager operation comprising:
   capturing a reference image with a pixel array having a plurality of pixels containing respective charge transfer transistors while the charge transfer transistors are in a first off state during a charge integration period; and
   capturing a comparison image while the charge transfer transistors are in a second off state, the second off state having a voltage different than the first off state; and
   operating the transfer transistors using the second off state if the comparison image is preferred to the reference image.

2. The method of claim 1, further comprising:
   repeating the steps of capturing the reference image and capturing the comparison image until the reference image is preferred to the comparison image, wherein different values for the voltage of the second off state are used in each repetition.

3. The method of claim 2, wherein the second off state has a voltage in each repetition that is lower than the voltage of the second off state in the previous repetition.

4. The method of claim 2, wherein the second off state has a voltage in each repetition that is higher than the voltage of the second off state in the previous repetition.

5. The method of claim 1, further comprising:
   repeating the steps of capturing the reference image and capturing the comparison image until the reference image is preferred to the comparison image, wherein the second off state has a lower voltage in each repetition than the voltage of the second off state in the previous repetition; and
   repeating the steps of capturing the reference image and capturing the comparison image until the reference image is preferred to the comparison image, wherein the second off state has a higher voltage in each repetition than the voltage of the second off state in the previous repetition.

6. The method of claim 1, further comprising:
   repeating the steps of capturing the comparison image and comparing the images, and modifying the reference voltage until the reference image is preferred to the comparison image;
   wherein the second off state has a different voltage in each repetition; and
   wherein the first off state of each repetition has the voltage of the second off state in the previous repetition.

7. An imaging device comprising:
   an array of pixels, each pixel comprising a charge transfer transistor;
   a control circuit that operates each pixel by applying a reference voltage to each charge transfer transistor to maintain the charge transfer transistor in an off state during a reference charge integration period and by applying a comparison voltage to each charge transfer transistor to maintain the charge transfer transistor in an off state during a comparison charge integration period, wherein the reference voltage and the comparison voltage are different; and
   a readout circuit being configured to perform a comparison of a reference image and a comparison image and to provide a result of the comparison to the control circuit.

8. The imaging device of claim 7, wherein the reference charge integration period and comparison charge integration period are repeated using different reference voltages and comparison voltages until the comparison performed by the readout circuit meets a termination condition.

9. The imaging device of claim 8, wherein the termination condition is that the mean signal value of the comparison image is lower than the mean signal value of the reference image.

10. The imaging device of claim 9, wherein the reference voltage of each repeated reference charge integration period is set to the comparison voltage of the previous comparison charge integration period.

11. The imaging device of claim 10, wherein each comparison voltage is higher than the current reference voltage.

12. The imaging device of claim 10, wherein each comparison voltage is lower than the current reference voltage.

13. A camera system comprising:
    an imaging device comprising:
    an array of pixels, each pixel comprising charge transfer transistor;
    a control circuit that operates each pixel by applying a reference voltage to each charge transfer transistor to maintain the charge transfer transistor in an off state during a reference charge integration period and by applying a comparison voltage to each charge transfer transistor to maintain the charge transfer transistor in an off state during a comparison charge integration period, wherein the reference voltage and the comparison voltage are different; and
    a readout circuit being configured to perform a comparison of a reference image and a comparison image and to provide a result of the comparison to the control circuit.

14. The system of claim 13, wherein the control circuit:
    stores a value representing a preferred voltage based on the result of the comparison;
    repeatedly operates each pixel using the stored value to determine the reference voltage; and
    updates the stored value after each repetition based on the result of the comparison.

15. The system of claim 13, wherein the camera system comprises a digital still camera.

16. The system of claim 13, wherein the camera system comprises a digital single-lens reflex camera.

17. The system of claim 13, wherein the camera system comprises a digital video camera.

18. A processing system comprising:
    a processor; and
    an imaging device comprising:
    an array of pixels, each pixel comprising a charge transfer transistor;
    a control circuit that operates each pixel by applying a reference voltage to each charge transfer transistor to maintain the charge transfer transistor in an off state during a reference charge integration period and by applying a comparison voltage to each charge transfer transistor to maintain the charge transfer transistor in an off state during a comparison charge integration period, wherein the reference voltage and the comparison voltage are different; and
    a readout circuit being configured to perform a comparison of a reference image and a comparison image and to provide a result of the comparison to the control circuit.

19. The processing system of claim 18, wherein the control circuit repeatedly operates each pixel using the comparison voltage of a previous repetition as the current reference voltage and sets the current comparison voltage to a voltage that is a fixed voltage level higher than the current reference voltage.

20. The processing system of claim 18, wherein the control circuit repeatedly operates each pixel using the comparison voltage of a previous repetition as the current reference voltage and sets the current comparison voltage to a voltage that is a fixed voltage level lower than the current reference voltage.

21. The processing system of claim 18, wherein the control circuit repeatedly operates each pixel using the comparison voltage of a previous repetition as the current reference voltage and sets the current comparison voltage to a voltage that is a fixed percentage of the current reference voltage.

* * * * *